United States Patent [19]

Kutz et al.

[11] 4,275,683

[45] Jun. 30, 1981

[54] APPARATUS FOR APPLYING FOAM TO A MOVING WEB

[75] Inventors: Johannes Kutz, St. Tönis; Walter Keller, Willich; Max Krüger, Krefeld; Eduard Küsters, Gustav-Fünders-Web 18, 4150 Krefeld, all of Fed. Rep. of Germany

[73] Assignee: Eduard Küsters, Krefeld, Fed. Rep. of Germany

[21] Appl. No.: 76,988

[22] Filed: Sep. 20, 1979

[30] Foreign Application Priority Data

Apr. 14, 1979 [DE] Fed. Rep. of Germany ....... 2915289

[51] Int. Cl.³ ................................................ B05L 5/02
[52] U.S. Cl. .................................. 118/407; 68/205 R; 118/261
[58] Field of Search ............... 118/407, 413, 414, 415, 118/324, 325, 261; 68/200, 205 R; 427/244

[56] References Cited

U.S. PATENT DOCUMENTS

| 2,054,448 | 9/1936 | Russell | 118/413 X |
| 2,565,319 | 8/1951 | Newman | 118/407 X |
| 3,659,553 | 5/1972 | Tobias | 118/413 X |
| 4,056,423 | 11/1977 | Hughes | 118/413 X |
| 4,109,034 | 8/1978 | Welch | 118/414 X |
| 4,119,060 | 10/1978 | Mochizuki et al. | 118/653 |

FOREIGN PATENT DOCUMENTS

| 703930 | 3/1941 | Fed. Rep. of Germany | 118/407 |
| 2631340 | 1/1977 | Fed. Rep. of Germany | 118/407 |

*Primary Examiner*—Morris Kaplan
*Attorney, Agent, or Firm*—Kenyon & Kenyon

[57] ABSTRACT

In apparatus for applying foam to a moving web comprising a foam generator and a foam box which is coupled to the foam generator, the foam box arranged transversely to the web, extending over its width, and having on its underside an opening which extends over the width of the web and under which a rotatable cylinder is arranged which extends over the width of the web, the cylinder being sealed against the foam box except for an exit for the foam, the cylinder in its rotation, carrying foam from the foam box along at its surface and depositing it on the web passing underneath the cylinder, is a wall element is disposed on the side of the cylinder which is descending during revolution, the wall element, together with the cylinder, forming a canal which is tapered in the circumferential direction of the cylinder with the canal ending in the region between the height of the axis of the cylinder and one half the height of the cylinder above, and a wiper inclined downwardly toward the web rests against the cylinder below the end of said canal to permit foam to be deposited on the web by gravity.

16 Claims, 7 Drawing Figures

APPARATUS FOR APPLYING FOAM TO A MOVING WEB

BACKGROUND OF THE INVENTION

This invention relates for apparatus for applying a foam to a moving web in general, and more particularly an improved apparatus of this nature which has better control over the amount of foam applied to the web.

Apparatus for applying foam to a moving web which includes a foam generator and a foam box which is coupled to th foam generator, the foam box being arranged transversely to the web, extending over its width and having on its underside, an opening which extends over the width of the web, and under which a rotatable cylinder is arranged which extends over the width of the web, the cylinder being sealed against the foam box except for an exit for the foam, with the cylinder, in its rotation, carrying foam along at its surface, from the foam box and depositing it on the web passing underneath the cylinder, is described in German Offenlegungsschrift No. 26 31 340.

In the known design, the objective is the manufacture of fibrous fabrics which are impregnated with an aqueous binder. Above the cylinder, a funnel-like charging box is arranged, the walls of which extend approximately radially to the cylinder. The foam which rests in the charging box on the cylinder is carried along at the surface of the cylinder under the wall which is in front during rotation, and is transferred by the cylinder to the web of material which passes underneath it. At the front edge of the charging box, a strip-like wiper blade is provided for adjusting the gap which determines the layer thickness of the foam carried along by the cylinder. In impregnating a fiber fabric with a binder, great uniformity of the foam application is not important. It therefore does not matter if the foam carried along at the surface of the cylinder sometimes is not completely uniform, or if a bulge is formed on the entrance side between the cylinder and the web. In foam dyeing, however, these phenomena are not permissible, since even small differences in the amount of liquid applied result in differences in the depth of the hue, which are distinctly visible in the finished product and can be tolerated in no way if the dyed material is, for instance, lengths of rugs to be used as display material.

SUMMARY OF THE INVENTION

It is an object of the present invention to develop apparatus of the type described above in such a manner that uniform application of the foam is ensured.

According to the present invention, this problem is solved by disposing a wall element on the side of the cylinder which is descending during revolution, the wall element together with the cylinder forming a canal which is tapered in the circumferential direction of the cylinder, the canal ending in the region between the height of the axis of the cylinder and one-half the height of the cylinder above the axis, and by disposing a wiper which is inclined downwardly toward the web so as to rest against the cylinder below the end of the canal.

The foam is carried along by the rotating cylinder into the tapered canal. The slight pressure caused thereby equalizes inhomogeneities of the foam, for instance, large bubbles are burst into several small ones or they are held back until they have split into several smaller ones. The equalized foam layer slides down via the wiper onto the web without being further engaged. The transfer onto the web takes place under the influence of gravity, without contact between the cylinder or the wiper and the web, which is of importance especially in the case of webs with a nap, for instance, rugs.

Arrangements with a revolving cylinder which carries the material to be transported along at its surface, from which it is stripped by means of a wiper blade and is conducted onto a web passsing underneath, are known per se, for instance, from German Pat. No. 703 930. The known arrangements, however, are intended for liquids or fiber suspensions. The cylinder dips into a trough which is arranged undernearth and contains the liquid from above, and carries the liquid along in a thin layer by adhesion to its surface. Foam, however, has a totally different behavior and does not spread over a surface but also retains a certain shape without being confined. While therefore a liquid assumes a uniform distribution all by itself, transporting foam requires the additional wall element provided by the present invention, which forms the tapered canal, in order to bring the foam which has a shape of its own, to assume uniform distribution.

In accordance with a further feature of the present invention, the wall element is curved outward on the side facing the cylinder i.e., in the same sense as the surface of the cylinder, and forms, together with the latter, a curved, tapered canal.

The settability of the wall element with respect to the cylinder in the region of the discharge opening allows the apparatus to adapt to different desired flow rates or to different properties of the foam.

Such settability can be realized by a wall element hinged above the cylinder with an adjusting device.

In accordance with a further embodiment of the present invention, two parallel cylinders are provided on the underside of the foam box. In the illustrated embodiment, the cylinders roll on each other and the cylinder away from the canal is higher than the cylinder adjoining the canal. It is also possible for the cylinders to be spaced, sealed against each other with a seal and to have different circumferential velocities.

In accordance with an important further embodiment of the present invention, means are provided for forming an aperture which extends along the cylinder at the end of the canal and means for adjusting the aperture across the canal.

In accordance with the illustrated embodiment, the aperture is formed by a blade extending into the canal.

For, it has been found in tests that the passage cross section at the exit aperture must, in some cases such as in dyeing rugs with foam, be very small, down to the order of 1 mm. The foam which passes through this small cross section, immediately after leaving the canal, jumps to a larger layer thickness and thus gets onto the web. To maintain a gap width of about 1 mm over a length of about 5 m, which corresponds to the working width customary today for dyeing rugs, is not simple without excessive amounts of equipment. However, even a deviation from 1 mm to 1.3 mm represents an increase of 30% and therefore, a local difference of the amount applied of likewise 30%, which leads to a completely different depth of hue and therefore, to rejects. Just because the gap, in absolute terms, is so small, even relatively small deviations amount to so much. Since it is practically impossible to fabricate and brace a wall element 5 m long so accurately and with justifiable expense that tolerances of the required order of magnitude can be maintained, the problem was solved by the provision of the additional aperture which is provided at the lower end of the canal. The wall element can thereby be fabricated and braced without regard to special tolerances, while the limitation of the passage cross section itself at the canal exit is accomplished by the aperture formed with the blade. The aperture blade has the additional advantage that it extends in the manner of a knife edge into the path of the foam and destroys major foam bubbles, so that the foam structure is further equalized.

The aperture blade may be adjustable along the cylinder to different passage cross sections if different amounts of application are required. The edge of the aperture blade can be substantially straight or may have pattern-like cutouts, which makes patterns with strip-like different amounts of application possible.

In accordance with a further feature of the invention at least two aperture blades which are arranged on top of each other and extend into the canal cross section either selectably or simultaneously in order to influence the passage cross section can also be provided.

Furthermore, the lower edge of the wiper should be arranged closely above the web, so that the uniform layer present on the wiper is transferred as directly as possible to the web and is not scattered by free fall through a considerable height and thereby causing it to become non-uniform again.

In order to prevent a foam bulge from forming at the wiper, which would also lead to nonuniformity, it is advantageous, according to another feature of the present invention, to arrange the apparatus so that the side of the wiper carrying the foam points in the travel direction of the web.

The foam is thereby not conducted along the underside of the wiper but is conducted from the upper side of the wiper directly to the other side, so that no foam accumulation can form.

DETAILED DESCRIPTION OF THE INVENTION

In the illustrated embodiments, the foam applicator is used for dyeing rugs. However, it is not limited thereto. In accordance with FIG. 1, a rug 1 is transported approximately horizontally, with its nap 2 facing up, by rollers 3 in the direction of the arrow 4.

Figure 1:
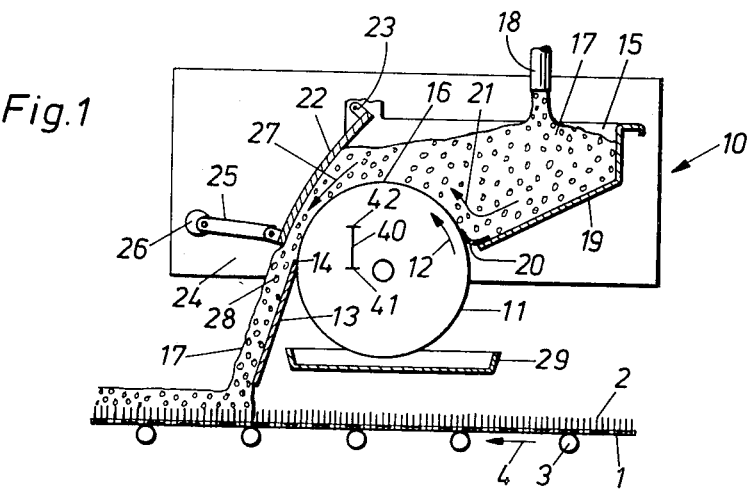
FIG. 1 shows a vertical longitudinal section through a foam applicator for rugs, comprising one cylinder.

In the foam applicator 10 of FIG. 1, a cylinder 11 is provided which is arranged transversely above the rug web 1 at a distance and is rotated in the direction of the arrow 12. On the side which descends during rotation, a wiper 13 rests against the cylinder 11. From its contact point 14, it is inclined downward toward the rug in the travel direction 4 of the rug. The cylinder 11 forms part of the bottom of a foam box 15, which is kept filled with foam 17 from a feed pipe 18 to above the top 16 of the cylinder 11. The foam box 15 comprises a bottom 19 which is inclined at an angle to the cylinder 11 and is sealed against the cylinder 11 by a seal 20. The foam 17 slides on the bottom 19 toward the cylinder 11 and is carried along by cylinder 11, so that a motion of the foam in the direction of the arrow 21 results when the cylinder 11 rotates in the direction of the arrow 12.

Opposite the side of the cylinder 11 which descends during rotation, a wall element 22 is arranged which is curved outward and the radius of curvature of which is larger than the radius of the cylinder 11. Wall element 22 has its upper end at 23. The lower part of wall element 22 ends about at the height of the contact point 14 of the wiper 13. At the lower edge of the wall element 22, a linkage 25 is pivoted at point 24, and can be adjusted via an eccentric 26, so that the width of the curved canal 27 which is formed between the cylinder 11 and the wall element 22 in the region of an exit 28 can be varied. Through the design and arrangement of the wall element 22 relative to the cylinder 11, a canal 27 is obtained which is tapered toward the exist opening 28 in funnel-fashion. The wall element 22 and the canal 27, respectively, end in a region 40 having a height between the height 41 of the axis of the cylinder 11 and the height of one-half the cylinder 42 above.

The foam 17 emerging from the exit opening 28 slides down the wiper 13 in a uniform layer and reaches the rug web 1 which passes by near the lower edge of the wiper 13 in the direction of the arrow 4, i.e., toward the side of the wiper 13 carrying the foam 17.

Under the cylinder 11, a collecting tray 29 is arranged which collects liquid dripping down, so that it does not produce spots of different hue on the rug web 1.

Figure 2:
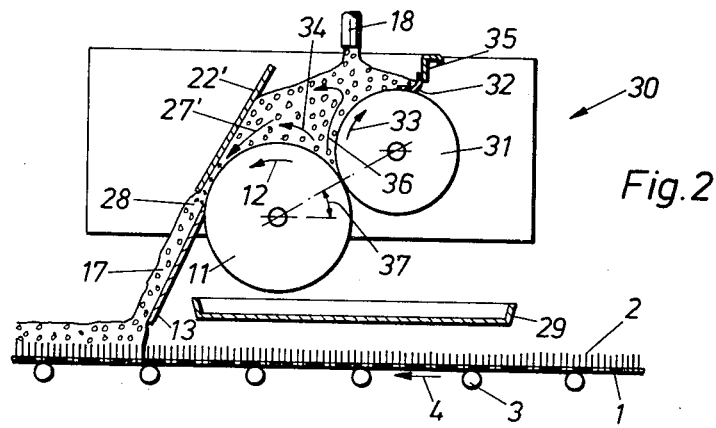
FIG. 2 shows a corresponding view of a foam applicator with two cylinders.

The design of the foam application 30 of FIG. 2, corresponds in principle to that of the foam applicator 10 of FIG. 1 and to that extent shows the same reference numerals. However, it has a stationary wall element 22' in the form of a substantially flat plate, which together with the cylinder 11 forms the tapered canal 27'. The inclined bottom 19 is replaced by a cylinder 31 which, in the illustrated embodiment, is higher than the cylinder 11, so that the plate defined by the axes of the cylinders 11 and 31 makes an angle 37 of about 40° with the horizontal, so that foam is already urged toward the canal 27 by the arrangement of the cylinders 11 and 31. The cylinder 31 has about the same diameter as the cylinder 11 and rolls on it. However, it is also possible to let the cylinder 31 revolve at a different circumferential velocity either in the same or in the opposite sense. In that case, the cylinders 11 and 31 must not touch each other, of course, and a seal must be provided between them so that the foam does not run out between them. The foam box 35 is in any event defined at the bottom only by the cylinders 11 and 31. The cylinder 31 is sealed against the ege of the foam box 35 by a seal 32.

Through the rotation of the cylinders 11 and 31 in the direction of the arrows 12 and 33, the quantity of foam that has sunk into the wedge between the cylinders 11, 31 is always taken along at the surfaces of the cylinders to the top, so that a flow of the foam in the direction of the arrows 34 and 36 results and no dead zone within the foam is formed.

Figure 3:
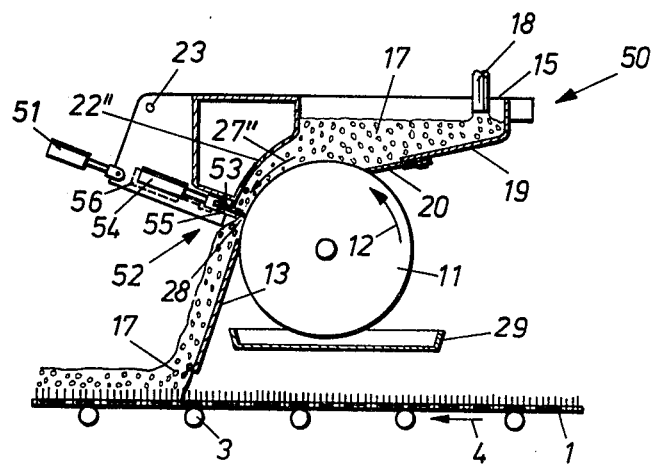
FIG. 3 is a corresponding view of a foam applicator with an aperture.

In FIG. 3, a foam applicator 50 is shown, the basic design of which corresponds to that of FIG. 1, and to that extent it has the same reference numerals.

For reasons of strength, the wall element 22' is designed as a hollow-box beam and, together with the cylinder 11, forms the tapered canal 27''. The wall element 22'' is hinged about a pivot 23 and positioned by a hydraulic, electrical or mechanical actuating element 51, so that the passage cross section of the canal 27" in the vicinity of the exit opening 28 is variable.

At the lower end of the wall element 22', an aperture as 52 is arranged. The aperture 52 comprises an aperture blade 53 which extends over the width of the web and projects from the outside transversely into the canal 27", and which can be inserted into the canal to different depths by actuators 54. The entire arrangement is assembled to the wall element 22' and can be displaced together with the latter by the actuator element 51. The blade 53 extends essentially perpendicular to the canal 27". It can also extend slightly inclined in the flow direction of the foam 17, so that the corner between the wall element 22' and the aperture blade 53 cannot form a dead space, in which foam left there collapses.

In FIG. 3, a second aperture blade 55 with separate actuators 56 is shown. Blade 55 is arranged closely under the aperture blade 53 and can be advanced with the latter into the discharge cross section of the canal 27".

Figure 4:
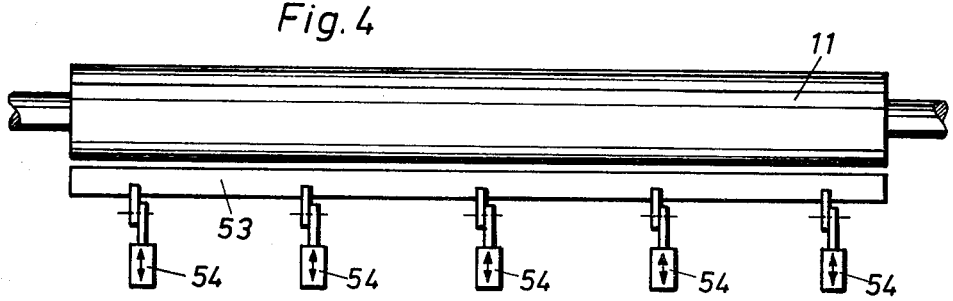
FIGS. 4 to 7B show various embodiments of the aperture arrangement.

In FIG. 4, the arrangement of the cylinder 11 with the blade 53 is shown once more separately. It will be seen that over the length of the cylinder 11 or the aperture blade 53 several actuators 54 are arranged each of which can be driven separately.

Figure 5:
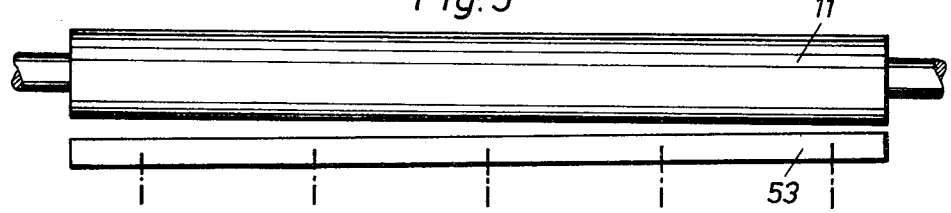
Figure 6:
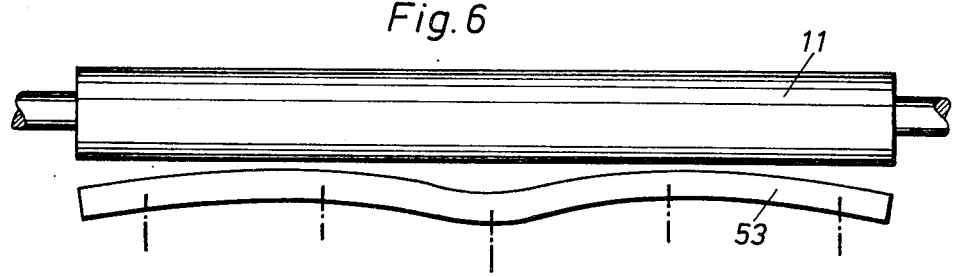

In this manner it is possible, according to FIGS. 5 and 6, by arc-shaped on-edge deformation of the aperture blade 53, to let the latter protrude to different depths into the canal 27" and to make the discharge cross section over the length of the cylinder 11 or the width of the web 1 non-uniform in an intended manner, or to make it follow the non-uniform cylinder surface to obtain a uniform discharge cross section. This latter can be the case, for instance, if the cylinder 11 is bent somewhat over the width of the web under its weight. In that case, the aperture blade 53 would have to be bent forward somewhat in the middle. The distance differences shown in FIGS. 5 and 6 are, of course, shown greatly exaggerated. In another aspect, the arc-shaped deformation of the aperture blade 53 can serve for making the foam application different, to adapt it accordingly to properties of the web differing over the width.

Figure 7A:
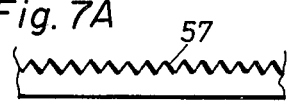
Figure 7B:
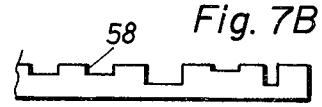

Normally, the aperture blade 53 will have a straight edge on the side projecting into the canal 27". In special cases, for instances, if a stripe pattern is intended, it is also possible, however, to provide a serrated edge 57 or a stepped edge 58, as can be seen in FIG. 7.

What is claimed is:

1. In apparatus for applying foam to a moving web comprising a foam generator and a foam box which is coupled to the foam generator, the foam box arranged transversely to the web, extending over its width, and having on its underside an opening which extends over the width of the web and under which rotatable cylinder means is arranged which extends over the width of the web, the cylinder means being sealed against the foam box except for an exit for the foam, said cylinder means in its rotation, carrying foam from the foam box along at its surface and depositing it on the web passing underneath the cylinder means, the improvement comprising:

(a) a wall element disposed on the side of the cylinder means which is descending during revolution, said wall element, together with the cylinder means, forming a canal which is tapered in the circumferential direction of the cylinder means said canal ending in the region between the height of the axis of the cylinder means and one half the height of the cylinder means above; and (b) a wiper inclined downwardly toward the web resting against the cylinder means below the end of said canal.

2. The improvement according to claim 1, wherein said wall element is curved outward on the side facing the cylinder relative to the cylinder means.

3. The improvement according to claim 1 and further including means to vary the distance of said wall element from said cylinder means in the region of the discharge opening in order to vary the discharge opening formed between the cylinder and the wall element.

4. The improvement according to claim 3, wherein said wall element is hinged above the cylinder means and said means to vary include an adjusting device for varying the distance between the wall element and the cylinder means.

5. The improvement according to claim 1 wherein said means comprise two parallel rotatable cylinders.

6. The improvement according to claim 5, wherein said cylinders roll on each other.

7. The improvement according to claim 5 wherein one said cylinder is disposed away from the canal and is higher than the other cylinder which is operatively associated with said wall element and wiper.

8. The improvement according to claim 5 wherein said cylinders have different circumferential velocities and are sealed against each other by a seal.

9. The improvement according to claim 1 and further including means forming an aperture which extends along the cylinder means at the end of the canal and means for adjusting said aperture across the canal.

10. The improvement according to claim 9, wherein said means for adjusting said aperture can adjust said aperture to provide passage cross sections which differ along the cylinder means.

11. The improvement according to claim 9 wherein said aperture is formed by a blade protruding into said canal.

12. The improvement according to claim 11 wherein said blade is substantially straight.

13. The improvement according to claim 11 wherein the edge of said blade protruding into said canal has patterned cutouts.

14. The improvement according to claim 11 comprising at least two aperture blades arranged on top of each other.

15. The improvement according to claim 1 wherein the lower edge of the wiper is arranged closely above the web.

16. The improvement according to claim 1 wherein the side of the wiper carrying the foam points in the travel direction of the web.

* * * * *